United States Patent
Hardee et al.

(10) Patent No.: US 10,740,446 B2
(45) Date of Patent: Aug. 11, 2020

(54) METHODS AND SYSTEMS FOR REMOTE SENSING DEVICE CONTROL BASED ON FACIAL INFORMATION

(71) Applicant: INTERNATIONAL BUSINESS MACHINES CORPORATION, Armonk, NY (US)

(72) Inventors: Christopher J. Hardee, Raleigh, NC (US); Shikhar Kwatra, Morrisville, NC (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 15/685,521

(22) Filed: Aug. 24, 2017

(65) Prior Publication Data

US 2019/0065713 A1    Feb. 28, 2019

(51) Int. Cl.
| | | |
|---|---|---|
| *G06F 21/32* | (2013.01) | |
| *G06Q 20/40* | (2012.01) | |
| *H04L 9/32* | (2006.01) | |
| *G06Q 20/32* | (2012.01) | |
| *G05B 19/00* | (2006.01) | |
| *G06K 9/46* | (2006.01) | |
| *G06K 9/00* | (2006.01) | |
| *G06F 3/01* | (2006.01) | |

(52) U.S. Cl.
CPC ......... *G06F 21/32* (2013.01); *G06Q 20/3224* (2013.01); *G06Q 20/40145* (2013.01); *H04L 9/3231* (2013.01); *G05B 19/00* (2013.01); *G06F 3/011* (2013.01); *G06F 3/012* (2013.01); *G06K 9/00362* (2013.01); *G06K 9/4671* (2013.01)

(58) Field of Classification Search
None
See application file for complete search history.

(56) References Cited

U.S. PATENT DOCUMENTS

| 6,603,491 | B2 | 8/2003 | Lemelson et al. |
| 8,295,556 | B2 | 10/2012 | Ohtani et al. |
| 8,856,541 | B1 * | 10/2014 | Chaudhury ............. G06F 21/32 382/115 |
| 9,020,832 | B2 | 4/2015 | Fischer et al. |
| 9,185,361 | B2 | 11/2015 | Curry |
| 10,274,727 | B2 * | 4/2019 | Iwase ................. G02B 27/0101 |
| 10,346,985 | B1 * | 7/2019 | Poliakov ................... G06T 7/62 |

(Continued)

OTHER PUBLICATIONS

Benfold et al.; Guiding Visual Surveillance by Tracking Human Attention; 2009; Retrieved from the Internet <URL: http://www.bmva.org/bmvc/2009/Papers/Paper145/Paper145.pdf>; pp. 1-11, as printed. (Year: 2009).*

(Continued)

*Primary Examiner* — Saleh Najjar
*Assistant Examiner* — Michael W Chao
(74) *Attorney, Agent, or Firm* — Griffiths & Seaton PLLC (57) ABSTRACT

Embodiments for controlling a remote sensing device by one or more processors are described. Facial information associated with a plurality of organisms is received. A remote sensing direction for a remote sensing device is selected based on the received facial information. A signal representative of the remote sensing direction is generated.

15 Claims, 8 Drawing Sheets

(56) References Cited

U.S. PATENT DOCUMENTS

| | | | | |
|---|---|---|---|---|
| 10,438,088 B2* | 10/2019 | Park | ............... | G06K 9/4671 |
| 10,474,231 B2* | 11/2019 | Liu | ............... | G06K 9/00617 |
| 2010/0205667 A1* | 8/2010 | Anderson | ............... | G06F 3/013 |
| | | | | 726/19 |
| 2011/0321143 A1* | 12/2011 | Angaluri | ............... | H04N 9/3194 |
| | | | | 726/6 |
| 2012/0243729 A1* | 9/2012 | Pasquero | ............... | G06F 3/013 |
| | | | | 382/103 |
| 2012/0314048 A1* | 12/2012 | Matos | ............... | G06K 9/00 |
| | | | | 348/78 |
| 2013/0083003 A1* | 4/2013 | Perez | ............... | G06F 3/005 |
| | | | | 345/419 |
| 2013/0124623 A1* | 5/2013 | Munter | ............... | H04L 65/403 |
| | | | | 709/204 |
| 2013/0135455 A1 | 5/2013 | Hjelm et al. | | |
| 2013/0154913 A1* | 6/2013 | Genc | ............... | G06F 3/012 |
| | | | | 345/156 |
| 2015/0058192 A1* | 2/2015 | Balram | ............... | G06F 21/32 |
| | | | | 705/35 |
| 2015/0059002 A1* | 2/2015 | Balram | ............... | G06F 3/011 |
| | | | | 726/28 |
| 2015/0085056 A1* | 3/2015 | Van Broeck | ............... | G06F 3/013 |
| | | | | 348/14.1 |
| 2015/0128291 A1* | 5/2015 | Hyodo | ............... | G06F 21/32 |
| | | | | 726/28 |
| 2016/0062456 A1* | 3/2016 | Wang | ............... | G06F 21/32 |
| | | | | 382/117 |
| 2016/0085949 A1* | 3/2016 | Peterson | ............... | G06F 21/32 |
| | | | | 726/19 |
| 2016/0156838 A1 | 6/2016 | Cheng et al. | | |
| 2016/0203581 A1 | 7/2016 | Keller et al. | | |
| 2016/0261793 A1* | 9/2016 | Sivan | ............... | H04N 19/597 |
| 2016/0275314 A1* | 9/2016 | Thorn | ............... | G06F 3/013 |
| 2016/0307038 A1* | 10/2016 | Skogo | ............... | G06K 9/00604 |
| 2016/0364561 A1* | 12/2016 | Lee | ............... | H04M 1/67 |
| 2017/0103194 A1* | 4/2017 | Wechsler | ............... | G06F 21/316 |
| 2017/0301037 A1* | 10/2017 | Baughman | ............... | G06Q 10/10 |
| 2017/0308770 A1* | 10/2017 | Jetley | ............... | G06K 9/4671 |
| 2018/0285683 A1* | 10/2018 | Chen | ............... | G06K 9/4671 |
| 2019/0043327 A1* | 2/2019 | Stent | ............... | G08B 13/19647 |
| 2019/0044723 A1* | 2/2019 | Prakash | ............... | H04L 9/085 |
| 2019/0249994 A1* | 8/2019 | Ida | ............... | H04N 7/181 |
| 2019/0251367 A1* | 8/2019 | Ida | ............... | G01C 21/3415 |
| 2020/0058271 A1* | 2/2020 | Kubota | ............... | G06T 3/40 |
| 2020/0065982 A1* | 2/2020 | Oami | ............... | H04N 5/23229 |
| 2020/0074184 A1* | 3/2020 | Kawai | ............... | G06K 9/00718 |

OTHER PUBLICATIONS

Lu et al.; Cooperative hybrid multi-camera tracking for people surveillance; 2008; Can. J. Elect. Comput. Eng., vol. 33; pp. 1-8, as printed. (Year: 2008).*

Otsuka et al.; A Realtime Multimodal System for Analyzing Group Meetings by Combining Face Pose Tracking and Speaker Diarization; 2008; ICMI'08, Oct. 20-22, 2008; pp. 1-8, as printed. (Year: 2008).*

Otsuka et al.; Quantifying Interpersonal Influence in Face-to-face Conversations based on Visual Attention Patterns; 2006; Retrieved from the Internet, URL: https://dl.acm.org/citation.cfm?id= 1125672; pp. 1-6, as printed. (Year: 2006).*

Cohen et al.; Detecting Mutual Awareness Events; 2012; Retrieved from the Internet, URL: https://ieeexplore.ieee.org/abstract/document/ 6148237; pp. 1-14, as printed. (Year: 2012).*

Matsumoto et al.; "Behavior Recognition Based on Head Pose and Gaze Direction Measurement"; 2000; Retrieved from the Internet— https://ieeexplore.ieee.org/abstract/document/895285; pp. 1-6, as printed. (Year: 2000).*

Cristani et al.; "Human behavior analysis in video surveillance: A Social Signal Processing Perspective"; 2013; Retrieved from the Internet—https://www.sciencedirect.com/science/article/pii/ S0925231212003141; pp. 1-12, as printed. (Year: 2013).*

Duffner et al.; "Visual Focus of Attention Estimation With Unsupervised Incremental Learning"; 2016; Retrieved from the Internet— https://ieeexplore.ieee.org/abstract/document/7331615; pp. 1-9, as printed. (Year: 2016).*

Conigliaro et al., "Observing Attention," FISU Winter Universiadg Conference, 2013 (10 pages).

Xu et al., "TurkerGaze: Crowdsourcing Saliency with Webcam based Eye Tracking," arXiv preprint arXiv:1504.06755, May 20, 2015 (9 pages).

Conigliaro et al., "Attento: ATTENTion Observed for Automated Spectator Crowd Analysis," HBU, ResearchGate, 2013 (11 pages).

* cited by examiner

METHODS AND SYSTEMS FOR REMOTE SENSING DEVICE CONTROL BASED ON FACIAL INFORMATION

BACKGROUND OF THE INVENTION

Field of the Invention

The present invention relates in general to computing systems, and more particularly, to various embodiments for controlling remote sensing devices, such as cameras.

Description of the Related Art

Remote sensing devices, such as cameras, are used in a wide variety of settings that are attended or occupied by various types of organisms, such as people or animals. The cameras may be used to monitor the activity of the organisms (e.g., for security purposes at locations such as malls, parks, etc.) or may be used to capture other activity taking place at the venue, such as a sports event, concert, etc.

In such situations, it may be difficult for those operating or managing the cameras to know exactly what portion of the venue/setting they should be trying to capture. For example, the cameras may be focused on/directed at one portion of the venue while some noteworthy activity at another portion of the venue goes unmonitored and/or isn't captured to the maximum extent possible.

For example, at a sports event, the cameras may be focused/directed at one portion of the field (e.g., the line of scrimmage at a football game) while some other noteworthy activity occurs on the field or in the crowd. In such an instance, there may be a significant delay between when the other activity begins and when the camera operators/managers notice, or are notified of, the activity.

SUMMARY OF THE INVENTION

Various embodiments for controlling a remote sensing device by one or more processors are described. Facial information associated with a plurality of organisms is received. A remote sensing direction for a remote sensing device is selected based on the received facial information. A signal representative of the remote sensing direction is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, remote sensing devices, such as cameras, are used in a wide variety of settings that are occupied (or attended) by various types of organisms, such as people or animals. The cameras may be used to monitor the activity of the organisms (e.g., for security purposes at locations such as malls, parks, etc.) or may be used to capture other activity taking place at the venue, such as a sports event, concert, etc. In such situations, it may be difficult for those operating or managing the cameras to know exactly what portion of the venue/setting they should be trying to capture.

For example, at a sports event, the cameras may be focused/directed at one portion of the field (e.g., the line of scrimmage at a football game) while some other noteworthy activity occurs on the field or in the crowd. In such an instance, there may be a significant delay between when the other activity begins and when the camera operators/managers notice, or are notified of, the activity. As a result, there is a chance the other activity will not be captured or monitored to the maximum extent possible.

As another example, consider a public place such as a park, mall, or zoo with multiple people (and/or animals) freely walking around and performing various types of activities. Even if the venue is equipped with a relatively thorough security system, in the event that some sort of security threat arises, even if the activity is captured by the cameras of the security system, there may be an undesirable delay between when the activity begins and when it is noticed by security personnel, the authorities, etc.

In view of the foregoing, a need exists for methods and systems that provide an indication of which direction(s) remote sensing devices, such as cameras, should be oriented (or pointed or aimed) and/or the position(s) of occurring activity that the devices should capture.

To address these needs, embodiments described herein provide methods and systems for controlling remote sensing devices based on, for example, the "collective gaze" of a group of organisms (e.g., people, animals, etc.). For example, in some embodiments, the heads, faces, and/or eyes of multiple organisms are monitored to determine which direction each of the organisms is gazing (or looking). When one or more conditions with respect to the collective gaze of the group is met (e.g., at least a particular percentage of the organisms are looking in the same direction and/or towards the same area), a signal is generated indicating that at least one remote sensing device should be oriented/aimed in the same direction and/or should capture any activity occurring in that direction or area.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
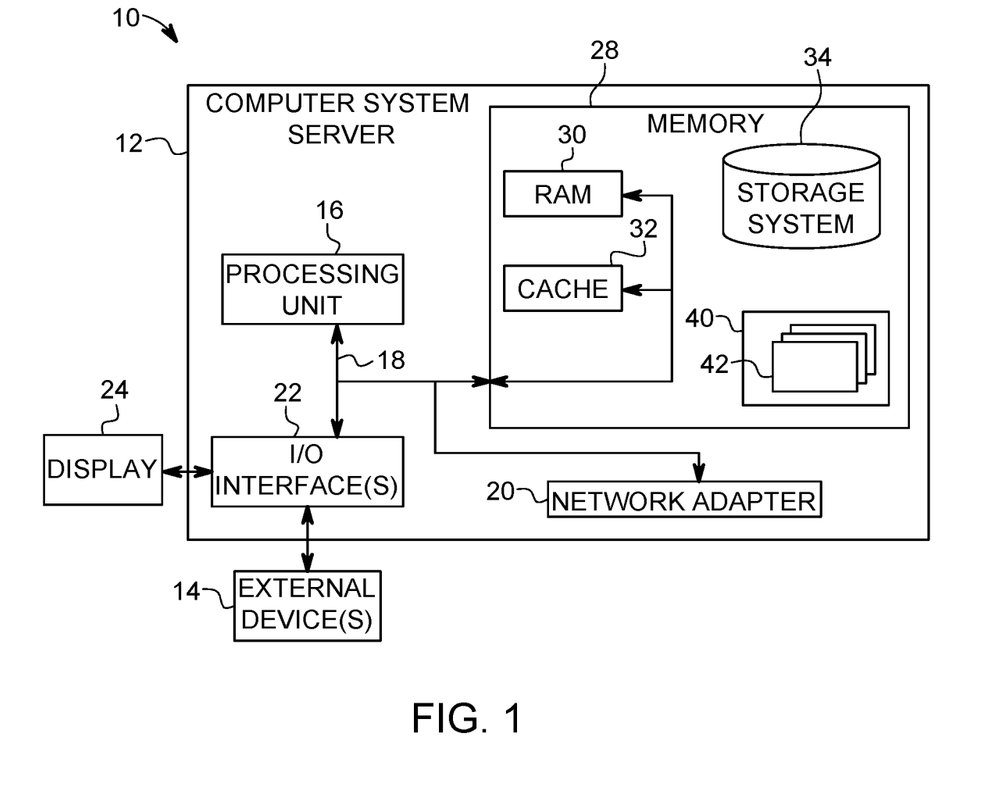
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, network PCs, and/or remote sensing devices (e.g., cameras). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
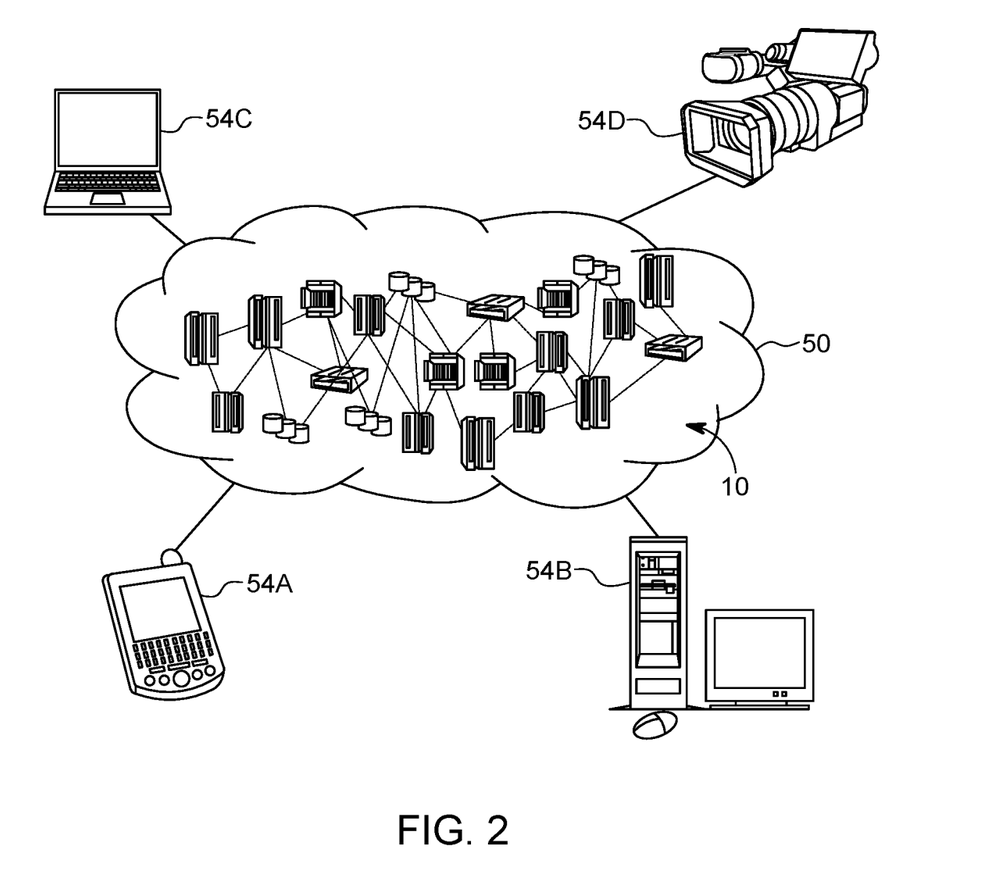
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or remote sensing device (e.g., a camera) 54D may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
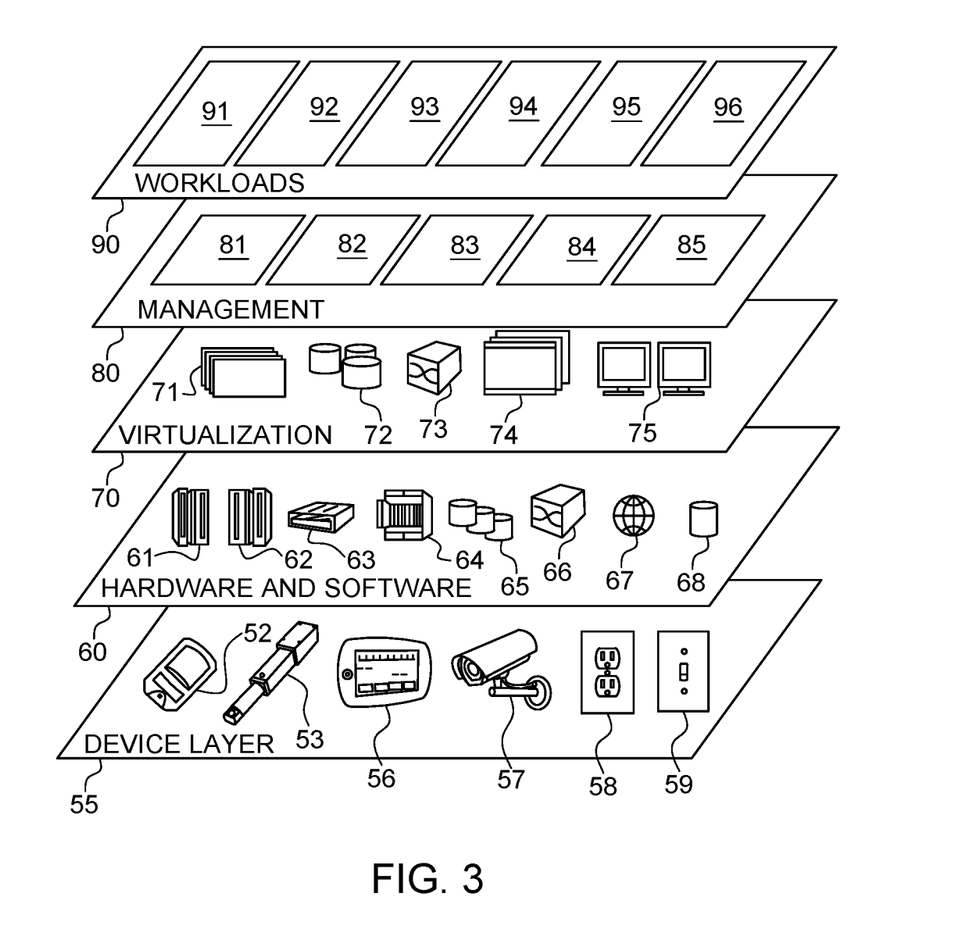
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for controlling remote sensing devices as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for controlling one or more remote sensing devices (e.g., cameras). Facial information associated with a plurality of organisms is received. A remote sensing direction (and/or a subject) for a remote sensing device is selected based on the received facial information. A signal representative of the remote sensing direction is generated. The remote sensing device may then be caused (e.g., automatically, by one or more processors, or manually) to become oriented in the selected remote sensing direction.

The received facial information may include at least one of head orientation (and/or movements) and eye orientation (and/or movements) of the plurality of organisms. The plurality of organisms may include, for example, humans (i.e., people) and/or animals (e.g., domesticated animals, wildlife, etc.).

The selecting of the remote sensing direction may include determining if a predetermined amount of the plurality of organisms are looking in the same direction. The remote sensing device may include an electromagnetic sensor (e.g., a camera). The causing of the remote sensing device to become oriented in the selected remote sensing direction may include causing the remote sensing device to rotate and/or causing the remote sensing device to move from a first position to a second position.

Figure 4:
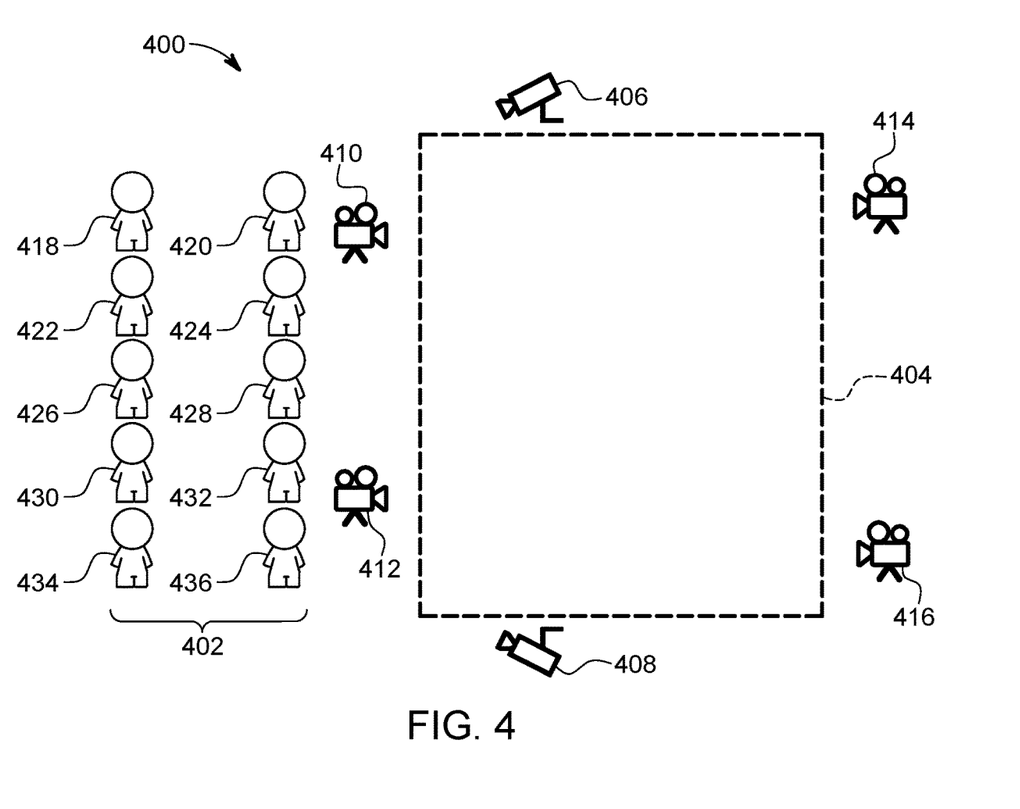
FIG. 4 is a block diagram of a system and/or location according to an embodiment of the present invention.

Referring now to FIG. 4, a system (and/or location) 400 in which embodiments described herein may be implemented is illustrated. Shown in FIG. 4 are a group of organisms 402, an activity/event area 404, facial information sensors 406 and 408, and monitoring devices 410-416. In the depicted embodiment, the group of organisms 402 includes ten individual organisms 418-436. In some embodiments, the organisms 418-436 are people (e.g., humans, spectators, etc.). However, it should be understood that in other embodiments, the organisms may be animals (e.g., domesticated animals, wildlife, etc.).

The activity area 404 may be any area, region, zone in which any sort of activity may be observed. As one example, the activity area 404 may be a field of play, or the entire "field level," at a sports venue (e.g., a football or baseball stadium). The facial information sensors 406 and 408 may be remote sensing devices (e.g., cameras) capable of detecting facial information of the organisms (e.g., spectators) 402 as described in greater detail below. The monitoring devices 410-416 may be any type of remote sensing devices suitable for monitoring the activity area 404 in the desired manner. Examples include cameras, infrared sensors, motion sensors, microphones, etc. Although not shown in detail, the monitoring devices 410-416 may include actuators (e.g., electric motors, pistons, etc.) configured to move (e.g., rotate and/or translate) the remote sensing devices and/or control the direction(s) in which the monitoring devices 410-416 are directed (or "aimed").

It should be noted that although the organisms 402, facial sensors 406 and 408, and the monitoring devices 410-416 are shown as being outside of the activity area 404 in FIG. 4, in some embodiments, one or more of those components may be located/positioned within the activity area 404. For example, location 400 may correspond to an area such as an airport, train station, park, or shopping mall in which the organisms 402 (e.g., people and/or animals) are moving about within the activity area 404. As such, the systems and methods described herein may be utilized for security and surveillance purposes.

In some embodiments, the system 400 may initially operate (and/or is operated) in a manner that includes one or more of the monitoring devices (e.g., cameras) 410-416 being directed (e.g., automatically and/or manually) toward various portions of the activity area 404. The information/data (e.g., video and/or audio) detected/captured by the devices 410-416 may then be transmitted to any other suitable electronic devices (e.g., to be broadcast, to be displayed on a large display screen at location 400, etc.).

Still referring to FIG. 4, in some embodiments, the facial information sensors 406 and 408 are used to monitor/detect the direction of gaze (and/or changes in the direction of gaze) of at least some of the organisms/spectators 402. Although only two facial information sensors 406 and 408 are shown, it should be understood that the system 400 may include more such sensors, which may be positioned in relatively close proximity to the spectators 402. After the direction of gaze is detected by the facial information sensors 406 and 408 (and/or determined based on information received/detected by the facial information sensors 406 and 408), a signal is generated that indicates a direction in which the monitoring devices 410-416 should be directed and/or a location/area the monitoring devices 410-416 should be directed towards. In some embodiments, the orientation and/or position of at least some of the monitoring devices 410-416 is automatically adjusted based on the signal.

Figure 5:
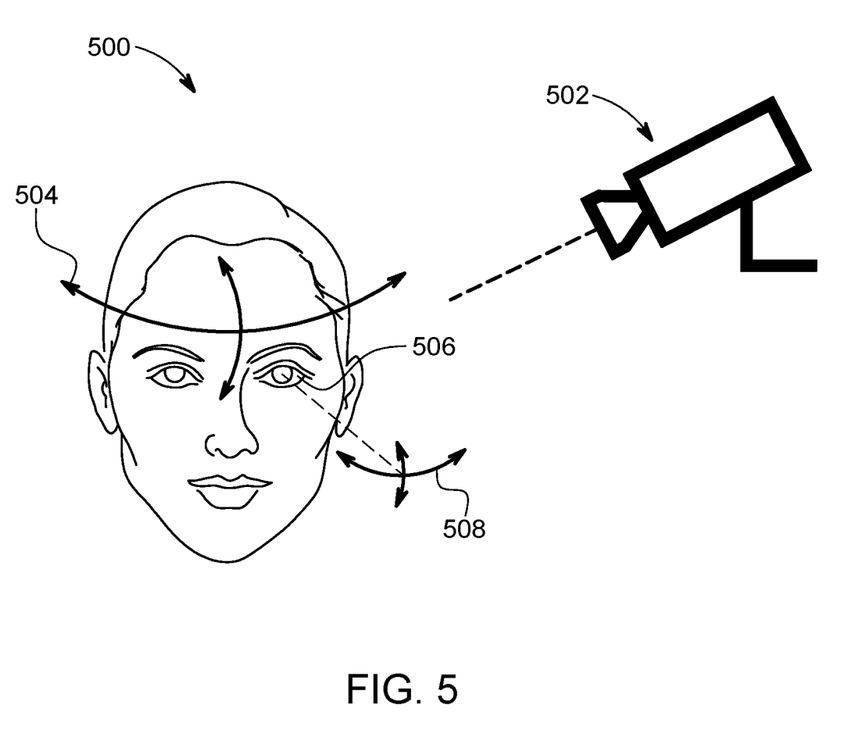
FIG. 5 is a side view of a head of an organism and a facial information sensor according to an embodiment of the present invention.

FIG. 5 illustrates a face (and/or head) 500 of an organism and a facial information sensor 502, which may be similar to those shown in FIG. 4. In the depicted embodiment, the face 500 is that of a person (or human or spectator). The facial information sensor 502 may be any remote sensing device capable of detecting the orientation and/or movements of the face 500 and/or the eye(s) 506 of the organism, as indicated by arrow groups 504 and 508, respectively. In some embodiments, the facial information sensor 502 is an electromagnetic sensor, such as a camera, perhaps combined with an infrared light source.

As will be appreciated by one skilled in the art, eye tracking may be implemented using, for example, optical methods. For example, light, visible and/or infrared, may be reflected from the eye (e.g., the cornea) and sensed by a video camera or some other optical sensor. The information is then analyzed to extract eye rotation from changes in reflections. Additionally, the pupil movement/parameters may be mapped to screen coordinates using generalized regression neural networks (GRNNs). With GRNNs, the mapping may not need to be an analytical function, and head movement may be explicitly accounted for by the gaze mapping function.

Figure 6:
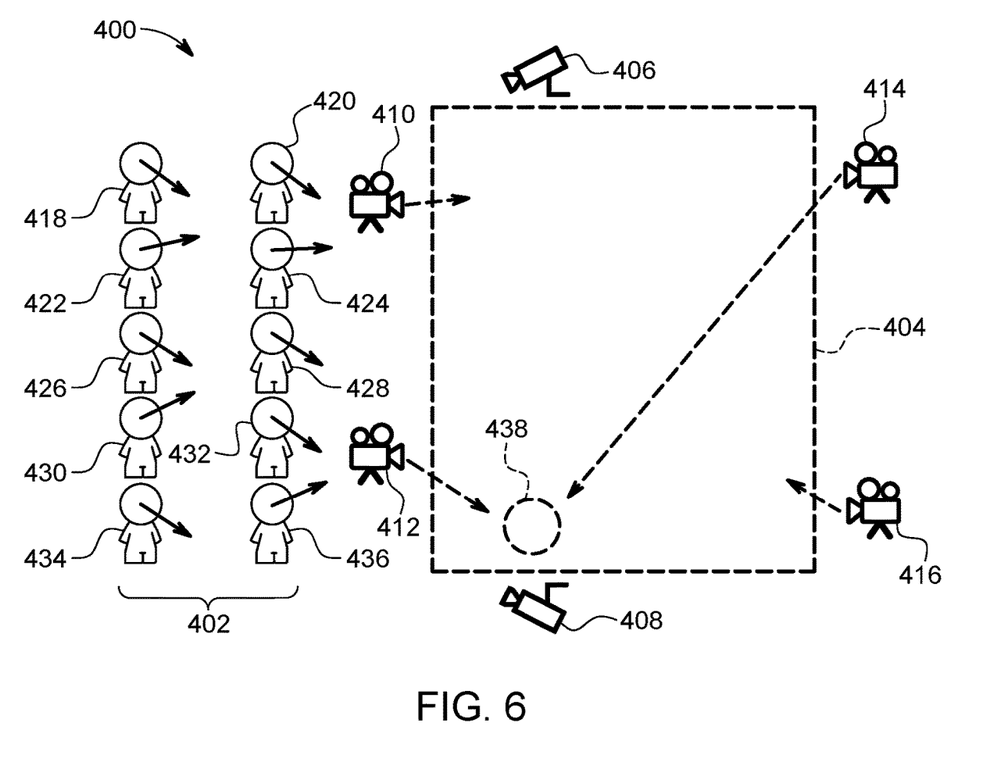
FIG. 6 is a block diagram of the system/location of FIG. 4 illustrating the functionality thereof in accordance with an embodiment of the present invention.

Referring now to FIG. 6, location 400 is shown while the facial information sensors 406 and 408 are monitoring the group 402. On each of the individual spectators 418-436, a direction of gaze as detected by facial information sensor 406 and/or 408 as indicated by an arrow. As shown, spectators 418, 420, 426, 428, 432, and 434 are gazing in the same general direction. In the particular example shown in FIG. 6, spectators 418, 420, 426, 428, 432, and 434 are all gazing towards portion 438 of the activity area 404. In some embodiments, when such a condition is detected, a signal is generated, which indicates that one or more of the monitoring devices 410-416 should be directed/controlled in a manner such that any activity at portion 438 of the activity area 404 can be monitored or captured.

In some embodiments, the signal related to the control of the monitoring devices 410-416 is generated after (e.g., in response to) one or more predetermined conditions or requirements regarding the collective gaze of the group 402 is met. For example, in some embodiments, a condition may be utilized that corresponds to a percentage of the group 402 gazing in the same direction and/or towards the same area. In the event that the condition is set to a simple "majority" of the group 402, the threshold has been met (and surpassed) in the scenario depicted in FIG. 6 because spectators 418, 420, 426, 428, 432, and 434 are gazing towards portion 438 of the activity area 404. That is, 60% of the spectators 418-436 (i.e., 6 of the 10 spectators 418-436) are gazing in the same direction.

As such, a signal may be generated that indicates that one of more of monitoring devices 410-416 should be directed/re-directed, actuated, moved, aimed, etc., in a suitable manner, towards portion 438 of the activity area 404 to monitor/capture any activity occurring there. The directing/re-directing of the monitoring devices may include rotating the monitoring devices 410-416. However, in some embodiments, the monitoring devices 410-416 may (also) be translated (e.g., laterally and/or vertically moved). For example, referring to FIG. 6, monitoring device 416 may be laterally moved from its position shown (i.e., a first position) to another position, such as one closer to the position of monitoring device 414 (i.e., a second position).

In some embodiments, the signal is provided to one or more of the monitoring devices 410-416, which are automatically rotated and/or translated in a manner suitable so that any activity at portion 438 is monitored/captured. However, in some embodiments, the signal is provided to appropriate personnel (e.g., camera operators) who may then manipulate the monitoring devices 410-416 in an appropriate manner via, for example, human intervention (e.g., manual controls, electronic controls, voice command, text command, etc.).

In the embodiment depicted in FIG. 6, monitoring devices 412 and 414 have been manipulated (or adjusted) to monitor/capture any activity at portion 438 (as indicated by the arrows shown emanating therefrom), while monitoring devices 410 and 416 continue to monitor other portions of the activity area 404.

Other exemplary conditions or requirements with respect to the collective gaze of the group 402 may be related to a simple count (or highest percentage) of the number of spectators 418-436 looking in the same direction and/or some of the spectators 418-436 looking in a particular direction. For example, regardless of the total number of organisms (i.e., spectators), if a certain number of them (e.g., five or more) gaze in the same direction, or if any of the organisms are gazing in a particular direction or towards a particular area (e.g., gazing in a direction or towards a particular area that rarely gets attention), the signal described above may be generated. In some embodiments, multiple conditions may be utilized simultaneously with, for example, particular conditions (and the corresponding direction of gaze) being given higher priority than others.

Also, a time/duration condition/requirement may be implemented. For example, the signal referred to above may not be generated unless any other suitable conditions with respect to the collective gaze of the spectators 418-436 is continuously detected and/or maintained for a predetermined amount of time (e.g., 10 seconds). The resulting "delay" may be particularly beneficial in the presence of relatively static and/or slow moving activities (e.g., in contrast to fast paced activities such as basketball games). Further, in some embodiments, such as those in which the monitoring devices 410-416 are automatically actuated, an override functionality may be provided such that the monitoring devices 410-416 are prevented, or stopped, from capturing the activities taking place in the determined direction of gaze (e.g., it is not appropriate and/or undesirable to monitor/capture the activity occurring in the direction of gaze).

Figure 7:
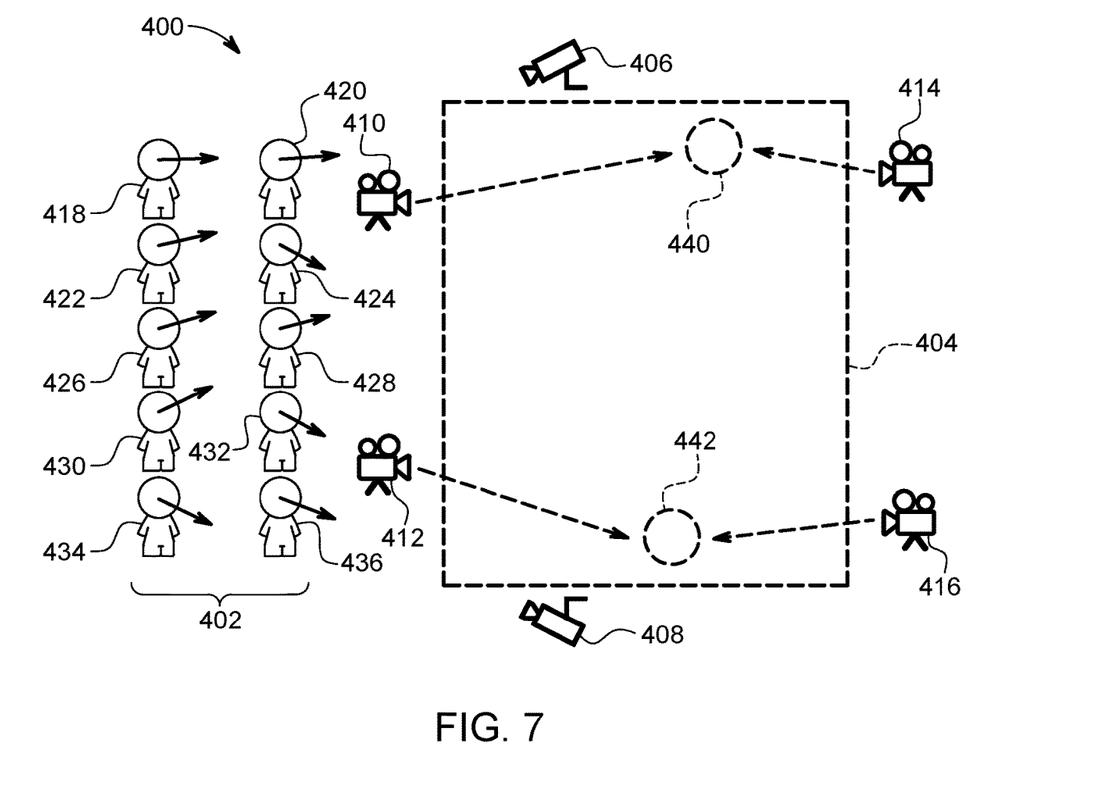
FIG. 7 is a block diagram of the system/location of FIG. 4 illustrating additional functionality thereof in accordance with an embodiment of the present invention.

Additionally, in some embodiments, the facial information sensors 406 and 408 may be utilized to detect occurrences in which members of the group 402 are gazing in different directions. An example of such a situation is shown in FIG. 7. As shown, spectators 418, 420, 422, 426, 428, and 430 have been determined to be gazing in a first direction, towards portion 440 of the activity area 404, while spectators 424, 432, 434, and 436 have been determined to be gazing in a second direction, towards portion 442 of the activity area 404.

In such a situation, in some embodiments, the signal (or multiple signals) may be generated to indicate the two, different areas of possible interest within the activity area 404 (e.g., assuming any pertinent conditions/requirements with respect to the number of spectators gazing in those directions have been met). The monitoring devices 410-416 may then be operated (e.g., adjusted, moved, etc.) in an appropriate manner to monitor/capture any activity in those areas. In the embodiment shown in FIG. 7, monitoring devices 410 and 414 have been manipulated (or adjusted) (if necessary) to monitor/capture any activity at portion 440 of the activity area 404 (as indicated by the arrows shown emanating therefrom), while monitoring devices 412 and 416 have been manipulated to monitor/capture any activity at portion 442 of the activity area 404.

Figure 8:
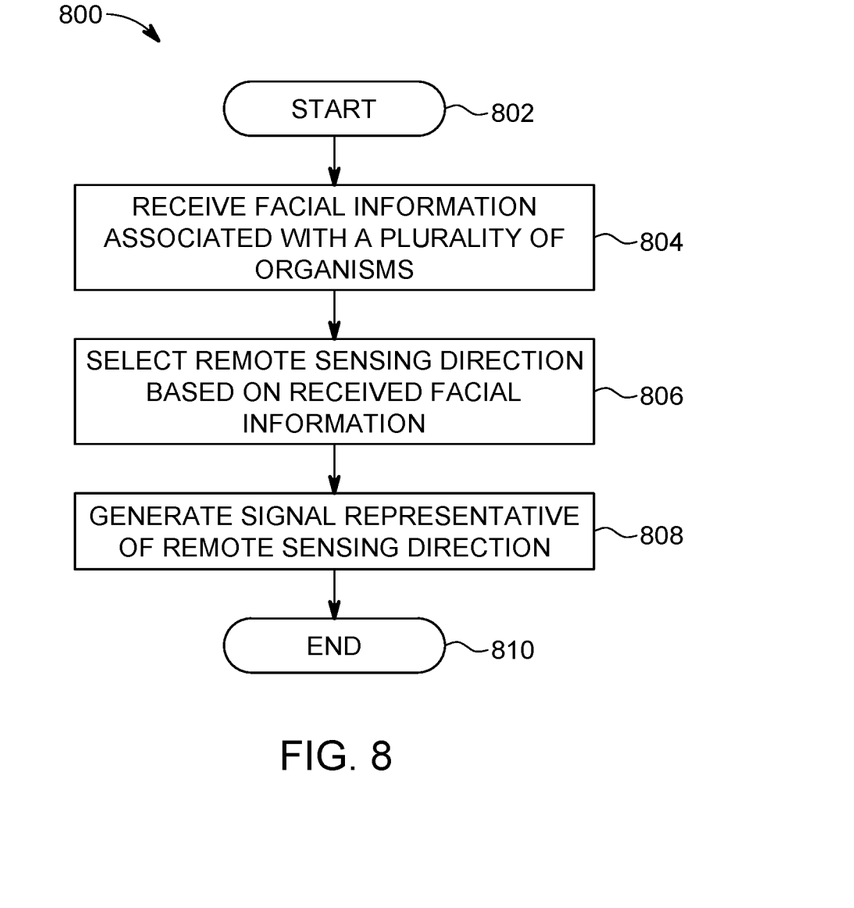
FIG. 8 is a flowchart diagram depicting an exemplary method for controlling a remote sensing device in which various aspects of the present invention may be implemented.

Turning to FIG. 8, a flowchart diagram of an exemplary method 800 for controlling one or more remote sensing devices (or monitoring devices), such as cameras, in accordance with various aspects of the present invention, is illustrated. Method 800 begins (step 802) with, for example, the remote sensing device(s) being utilized in a conventional manner at a location with multiple organisms (e.g., people, spectators, animals, etc.), such as at a public event (e.g., sports event, concert, etc.), a park, a mall, an airport, etc.

In some embodiments, one or more facial information sensors is deployed at the location, which is capable of retrieving facial information from the organisms that may be used to determine the direction of gaze of each of the organisms (e.g., head/face orientation/movements, eye movements, etc.). Such information is received (and/or retrieved) by, for example, the facial information sensors (step 804).

Based on the received facial information, a direction in which one or more of the remote sensing devices should be oriented/aimed and/or an area that should be monitored/captured by one or more of the remote sensing devices (i.e., a remote sensing direction) is selected (and/or determined) (step 806).

A signal representative of the remote sensing direction is then generated (step 808). The signal may be provided to operators and/or managers of the remote sensing devices (e.g., so that the remote sensing devices may be manually manipulated/adjusted). In some embodiments, the signal is utilized such that the remote sensing device(s) are automatically oriented/directed/aimed in the appropriate direction so that the remote sensing device(s) monitor/capture any activity that is occurring in the direction in which the organisms are gazing (i.e., in the remote sensing direction).

Method 800 ends (step 810) with, for example, the remote sensing devices being appropriately adjusted/manipulated in a manner consistent with the detected direction of gaze of the organisms. The remote sensing devices may continue to be oriented in such a direction until it has been determined that any activity of interest in that direction has ended.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for controlling a remote sensing device, comprising:
   receiving facial information associated with a plurality of organisms transiting a public area or venue in real-time; wherein the facial information includes an identified eye orientation of each of the plurality of organisms;
   selecting a remote sensing direction for a remote sensing device based on the received facial information; wherein the selecting of the remote sensing direction includes determining when over a predetermined percentage comprising a majority of the plurality of organisms transiting the public area or venue are gazing in the same direction according to the respective identified eye orientation of each of the majority of the plurality of organisms;
   generating a signal representative of the remote sensing direction; and
   automatically causing the remote sensing device to become oriented in the selected remote sensing direction.

2. The method of claim 1, wherein the received facial information further includes at least one of head orientation and eye movements of the plurality of organisms.

3. The method of claim 1, wherein the plurality of organisms includes at least one of humans and animals.

4. The method of claim 1, wherein the remote sensing device includes a camera.

5. The method of claim 1, wherein the causing of the remote sensing device to become oriented in the selected remote sensing direction includes at least one of causing the remote sensing device to rotate and causing the remote sensing device to move from a first position to a second position.

6. A system for controlling a remote sensing device, comprising:
   a remote sensing device;
   a memory; and
   at least one hardware processor executing instructions stored in the memory, wherein the at least one hardware processor, when executing the instructions:
     receives facial information associated with a plurality of organisms transiting a public area or venue in real-time; wherein the facial information includes an identified eye orientation of each of the plurality of organisms;
     selects a remote sensing direction for the remote sensing device based on the received facial information; wherein the selecting of the remote sensing direction includes determining when over a predetermined percentage comprising a majority of the plurality of organisms transiting the public area or venue are gazing in the same direction according to the respective identified eye orientation of each of the majority of the plurality of organisms;
     generates a signal representative of the remote sensing direction; and
     automatically causes the remote sensing device to become oriented in the selected remote sensing direction.

7. The system of claim 6, wherein the received facial information further includes at least one of head orientation and eye movements of the plurality of organisms.

8. The system of claim 6, wherein the plurality of organisms includes at least one of humans and animals.

9. The system of claim 6, wherein the remote sensing device includes a camera.

10. The system of claim 6, wherein the causing of the remote sensing device to become oriented in the selected remote sensing direction includes at least one of causing the remote sensing device to rotate and causing the remote sensing device to move from a first position to a second position.

11. A computer program product for controlling a remote sensing device by one or more processors, the computer program product comprising a non-transitory computer-readable storage medium having computer-readable program code portions stored therein, the computer-readable program code portions comprising:

an executable portion that receives facial information associated with a plurality of organisms transiting a public area or venue in real-time; wherein the facial information includes an identified eye orientation of each of the plurality of organisms;

an executable portion that selects a remote sensing direction for a remote sensing device based on the received facial information; wherein the selecting of the remote sensing direction includes determining when over a predetermined percentage comprising a majority of the plurality of organisms transiting the public area or venue are gazing in the same direction according to the respective identified eye orientation of each of the majority of the plurality of organisms;

an executable portion that generates a signal representative of the remote sensing direction; and an executable portion that automatically causes the remote sensing device to become oriented in the selected remote sensing direction.

12. The computer program product of claim 11, wherein the received facial information further includes at least one of head orientation and eye movements of the plurality of organisms.

13. The computer program product of claim 11, wherein the plurality of organisms includes at least one of humans and animals.

14. The computer program product of claim 11, wherein the remote sensing device includes a camera.

15. The computer program product of claim 11, wherein the causing of the remote sensing device to become oriented in the selected remote sensing direction includes at least one of causing the remote sensing device to rotate and causing the remote sensing device to move from a first position to a second position.

* * * * *